United States Patent Office 3,705,907
Patented Dec. 12, 1972

3,705,907
4-(2-HYDROXY)-3-AMINOPROPOXY)-INDOLE DERIVATIVES
Franz Troxler, Bottmingen, Switzerland, assignor to Sandoz Ltd. (also known as Sandoz AG), Basel, Switzerland
No Drawing. Continuation-in-part of application Ser. No. 860,397, Sept. 23, 1969. This application June 15, 1970, Ser. No. 46,478
Claims priority, application Switzerland, Feb. 19, 1970, 2,400/70
Int. Cl. C07d 27/56
U.S. Cl. 260—326.14 R   18 Claims

ABSTRACT OF THE DISCLOSURE

The invention concerns novel compounds of formula:

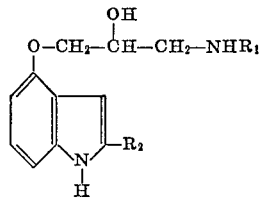

in which $R_1$ is lower alkyl, cycloalkyl having 3 to 4 carbon atoms, phenylalkyl of 8 to 10 carbon atoms or 1-adamantyl, and $R_2$ is hydroxymethyl or $COOR_5$, where $R_5$ is a hydrogen atom or lower alkyl radical, which are useful as β-adrenergic blocking agents. Processes for the production of the compounds of the invention and intermediates for the use therein are described.

---

This invention is a continuation-in-part of copending application Ser. No. 860,397, filed on Sept. 23, 1969, now abandoned.

The present invention relates to new indole derivatives of Formula I

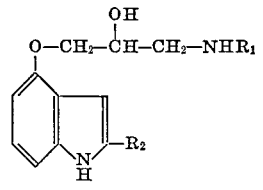

in which
$R_1$ signifies a lower alkyl radical, a phenylalkyl radical of 8 to 10 carbon atoms or a 1-adamantyl radical, and
$R_2$ signifies a hydroxymethyl, carboxyl or lower alkoxycarbonyl radical.

The invention also provides processes for the production of compounds of Formula I, characterised by
(a) Reacting a compound of Formula II

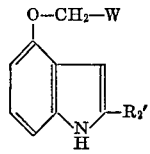

in which
$R_2'$ signifies a hydroxymethyl or lower alkoxycarbonyl radical, and
W signifies the group

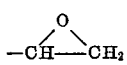

or

in which Y signifies a halogen atom,
with a compound of Formula III, $$H_2N—R_1 \qquad III$$

in which $R_1$ has the above significance,
to obtain a compound of Formula Ia

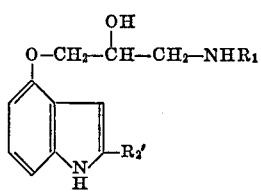

in which $R_1$ and $R_2'$ have the above significance, or
(b) Splitting off hydrogenolytically the benzyl radical from a compound of Formula IV

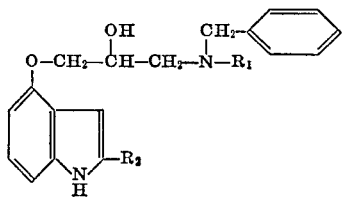

in which $R_1$ and $R_2$ have the above significance, to obtain a compound of Formula I, or
(c) Reducing a compound of Formula V

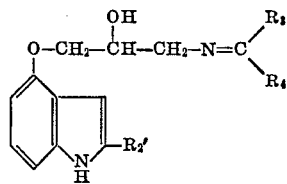

in which $R_2'$ has the above significance, and $R_3$ and $R_4$ which may be the same or different signify a lower alkyl radical, to obtain a compound of Formula Ib

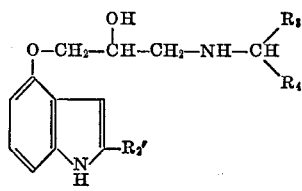

in which $R_2'$, $R_3$ and $R_4$ have the above significance, provided that when a compound of Formula Ib, in which $R_2'$ signifies a lower alkoxycarbonyl radical, is required, the reduction is effected by catalytic hydrogenation or with an alkali metal borohydride, or
(d) Reducing a compound of Formula Va,

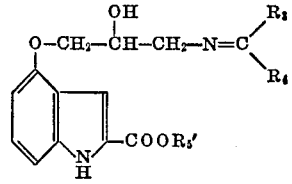

in which $R_3$ and $R_4$ have the above significance, and $R_5'$ signifies a lower alkyl radical, with a complex aluminum hydride, to obtain a compound of Formula Ic,

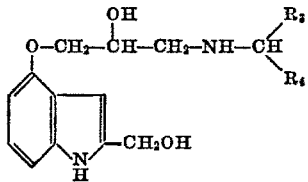
Ic in which $R_3$ and $R_4$ have the above significance, or (e) Reducing a compound of Formula Id,

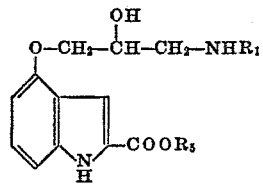
Id in which $R_1$ has the above significance, and
$R_5$ signifies a hydrogen atom or lower alkyl radical, to obtain a compound of Formula Ie,

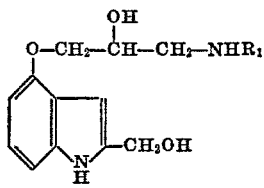
Ie in which $R_1$ has the above significance, or (f) Hydrolyzing a compound of Formula If,

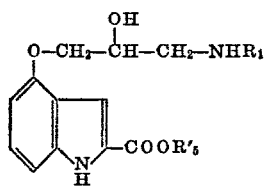
If in which $R_1$ and $R_5'$ have the above significance, to obtain a compound of Formula Ig,

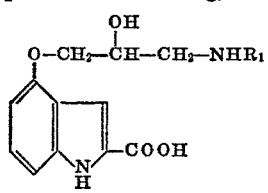
Ig in which $R_1$ has the above significance.

Process (a) is preferably effected in an organic solvent which is inert under the reaction conditions, e.g., a cyclic ether such as dioxane, or an aromatic hydrocarbon such as benzene or toluene. Suitable reaction items range for example from about 2 to 24 hours. The process is suitably effected at a temperature of from 20° to 120° C., preferature of the reflux temperature of the reaction mixture. The addition of an acid-binding agent, e.g. an inorganic base, e.g. an alkali metal carbonate such as potassium carbonate, or an organic base such as pyridine or triethyl amine, may be advantageous but is not essential. Alternatively an excess of the compound of Formula III may suitably be employed.

After the reaction is completed, the reaction mixture may be worked up by conventional techniques, for example by concentrating it by evaporation, shaking out the residue between an aqeuous acid, e.g. 1 N tartaric acid or 1 N hydrochloric acid, and an organic solvent which is not miscible with the acid, e.g. ethyl acetate, neutralizing the acid aqueous phase, e.g. with an aqeuous sodium carbonate solution, taking up the liberated basic products in an organic solvent, e.g. methylene chloride, and finally concentrating the separated and dried organic phase by evaporation, preferably at reduced pressure.

Process (b) may, for example, be effected by hydrogenation in the presence of a catalyst, preferably palladium. The process is suitably effected in a solvent which is inert under the reaction conditions, e.g. ethyl acetate, or a lower alkanol such as methanol, and is preferably effected at room temperature and normal pressure. After hydrogenation is completed, the catalyst may be filtered off and the filtrate evaporated to dryness.

Process (c) may, for example, be effected by hydrogenation in the presence of a catalyst such as palladium. The process is suitably effected in an organic solvent which is inert under the reaction conditions, e.g. a lower alkanol such as methanol, or in acetic acid. After the taking up of hydrogen is completed, the catalyst is filtered off and the filtrate is concentrated by evaporation, whereby compounds of Formula Ib are obtained as residue.

The reduction in process (c) may also be effected with for example an alkali metal borohydride, preferably sodium borohydride. The process is suitably effected in an organic solvent which is inert under the reaction conditions, e.g. a lower alkanol such as methonl or ethanol. After reduction is completed the reaction mixture may, for example, be worked up as described in process (a).

Process (d) is effected with a complex aluminium hydride, e.g. lithium aluminium hydride or sodium dihydrobis(2-methoxyethoxy) aluminate. The process is preferably effected in an organic solvent which is inert under the reaction conditions, e.g. a cyclic or open chain ether such as tetrahydrofuran, and preferably at the reflux temperature of the reaction mixture. Suitable reaction times may, for example, range from one-half hour to several hours. The reaction mixture may, for example, be worked up by adding water to the same, filtering off the resulting precipitate and separating the organic phase. The precipitate may subsequently be washed out with the same organic solvent used in the reduction process, and the combined organic phases may be dried, e.g. over sodium sulphate. The organic phase may then be concentrated by evaporation, whereupon a compound of Formula Ic is obtained as residue.

Process (e) may be effected employing a reducing agent capable of reducing an ester or carboxylic acid group to a hydroxyalkyl group. The reduction may for example be effected with a complex aluminium hydride in manner analogous to process (d) described above.

The reduction in process (e) may also for example be effected by Bouveault-Blanc's method employing sodium in alcohol.

Process (f) may for example be effected by hydrolysis with an alkali or alkaline earth metal hydroxide, for example sodium, potassium or barium hydroxide. The hydroxide is suitably employed in aqueous alcoholic, e.g. methanolic or ethanolic, solution. The hydrolysis is suitably effected at room or elevated temperature depending on the starting material employed. The reaction mixture may be worked up by conventional techniques. For example, when barium hydroxide is employed for the hydrolysis, an equivalent of sulphuric acid may, after completion of the reaction, be added to the resulting mixture containing the barium salt of the compound of Formula Ig, the resulting barium sulphate may be filtered off and the filtrate concentrated, preferably at reduced pressure, to obtain the compound of Formula Ig as residue.

The hydrolysis in process (f) may for example also be effected with an alkaline ion exchange resin.

The resulting indole derivatives of Formula I may be isolated and purified by conventional techniques, e.g. by crystallization from a suitable solvent, e.g. ethyl acetate, a lower alkanol or acetonitrile. They are crystalline or oily compounds which are readily or fairly soluble in most organic solvents and in aqueous solutions of organic or inorganic acids.

The compounds of Formula I may be produced and isolated in free base form or in the form of acid addition salts.

With inorganic acids, e.g. hydrogen chloride, hydrogen bromide or sulphuric acid, or with organic acids such as oxalic, fumaric, maleic, tartaric, benzoic, methane-, ethane- or p-toluenesulphonic acid or N - cyclohexyl-sulphamic acid, the free base forms form stable salts which are usually water-soluble. The acid addition salt forms may be converted into the free base forms in manner known per se.

The compounds of Formula I are useful because they possess pharmacological activity in animals. In particular the compounds are useful β-adrenergic blocking agents as indicated by their antagonistic effect towards the frequency- and amplitude-increasing effect of adrenalin in the isolated, spontaneously beating guinea pig atrium at bath concentrations of from about $5 \times 10^{-9}$ to about $10^{-6}$ g./ml. They also lead to a strong inhibition of the tachycardia and hypotension caused by isoproterenol [1-(3,4-dihydroxyphenyl) - 2 - isopropylaminoethanol] in the narcotized cat.

For the above-mentioned use the dosage administered will, of course, vary depending upon the compound employed, mode of administration and treatment desired. However, in general satisfactory results are obtained when administered at a daily dosage of from about 0.15 to about 6 mg./kg. of animal body weight. For the larger mammals the total daily dosage indicated ranges from about 10 to about 400 mg.

The compounds of Formula I in which $R_2$ signifies a carboxyl group, moreover show a certain positive inotropic/chronotropic effect.

The new compounds may be used as medicaments on their own or in the form of appropriate medicinal preparations, e.g. tablets, dragées, suppositories or injectable solutions, for enteral or parenteral administration. Aside from the usual inorganic or organic pharmacologically inert adjuvants, e.g. lactose, starch, talc, stearic acid, water, alcohols, natural or hardened oils and waxes and the like, these preparations may also contain suitable preserving, stabilizing or wetting agents, solubilizers, sweetening or colouring substances and flavourings.

The compounds of Formula I may be used in the form of physiologically acceptable, water-soluble acid addition salts. The acid addition salt forms have the same order of activity as the free base forms.

The compounds of Formula II, employed as starting materials in process (a), may be produced by reacting a compound of Formula VI,

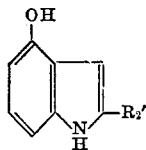   VI in which $R_2'$ has the above significance, in the form of a salt or in the presence of a base with an epihalohydrin.

Epihalohydrin molecules have two reactive sites, so that the above process yields a mixture of a compound of Formula II, in which W signifies the group

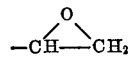

and the corresponding compound of Formula III, in which W signifies the group

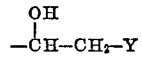

in which Y has the above significance. Such a mixture can be employed directly in process (a) so that separation is not necessary. If desired, however, the components may be separated by conventional techniques, e.g. by chromatography. The compound of Formula VI are sensitive to oxygen in a strongly alkaline medium so that the process is preferably effected in the absence of oxygen, e.g. in an atmosphere of nitrogen. The epihalohydrin employed is preferably epibromhydrin or epichlorhydrin.

In accordance with one embodiment of the process, an excess of epihalohydrin, preferably epichlorhydrin or epibromhydrin, is added to the compound of Formula VI in the presence of a base. The reaction mixture is preferably heated for an extended period, e.g. 2 to 10 hours, suitably while stirring, e.g. at the reflux temperature of the reaction mixture. Suitable bases include secondary amines, preferably piperidine, or morpholine, pyrrolidine or dimethyl amine, and tertiary amines such as triethyl amine or pyridine. The addition of a small amount of base suffices for the obtention of good yields.

The product may be isolated by conventional techniques, e.g. by distilling off the excess epihalohydrin or completely concentrating the reaction mixture by evaporation, optionally in a vacuum. The residue may be employed in process (a) as such without purification.

In accordance with a further embodiment of the process, the compound of Formula VI may be used in the form of a solution or suspension of an alkali metal or ammonium salt thereof, e.g. a sodium salt. Suitable solutions or suspensions may, for example, be produced by stirring at room temperature a compound of Formula VI in an equimolar aqueous alkali metal hydroxide or ammonia solution, or by reacting it in an organic solvent which is inert under the reaction conditions, e.g. a cyclic ether such as dioxane, or an aromatic hydrocarbon such as benzene or toluene, with an equimolar amount of an alkali metal alcoholate, amide or hydride. Alternatively, an alcoholic solution of an alkali metal salt of a compound of Formula VI may be evaporated to dryness and the residue suspended in an organic solvent which is inert under the reaction conditions, e.g. dimethoxyethane.

Furthermore, a compound of Formula VI may be converted into a corresponding salt in an organic solvent which is inert under the reaction conditions, e.g. a cyclic ether such as dioxane, by the addition of an aqueous alkali metal hydroxide or ammonia solution, or a solution of an alkali metal alcoholate in a lower alkanol, and the salts may be isolated by filtration or evaporation of the mixture, depending on its solubility in the solvent, and may subsequently be dissolved or suspended in a solvent which is inert under the reaction conditions, e.g. water, an alkanol, benzene or dimethyl ether.

1 to 10 equivalents of epihalohydrin may be added to the resulting solution or suspension of the salt of the compound of Formula VI at room temperature or at an elevated temperature, e.g. 50° C., and the mixture may be further stirred for an extended period, e.g. 2 to 24 hours, at room temperature or at an elevated temperature.

The compounds of Formula IV employed as starting materials in process (b) may be produced by (i) Reacting a compound of Formula II stated above with a compound of Formula VII,

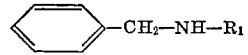   VII in which $R_1$ has the above significance, to obtain a compound of Formula IVa,

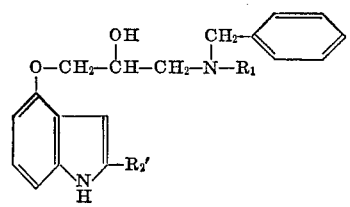   IVa in which $R_1$ and $R_2'$ have the above significance, or (ii) Reacting a compound of Formula VIII,

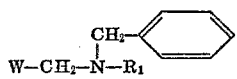   VIII in which W and $R_1$ have the above significance, with a compound of Formula VI stated above in an alkaline medium, to obtain a compound of Formula IVa stated above, or (iii) Hydrolyzing a compound of Formula IVb,

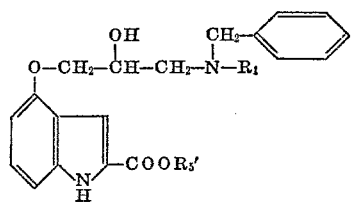   IVb in which $R_1$ and $R_5'$ have the above significance, to obtain a compound of Formula IVc,

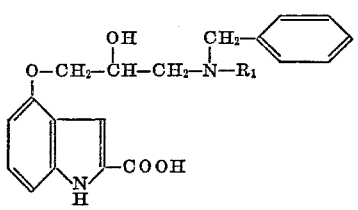   IVc in which $R_1$ has the above significance.

Process (i) may be effected in manner analogous to process (a) described above.

Process (ii) may suitably be effected at a temperature of from about 20° to 120° C. A solution or suspension of an alkali metal or ammonium salt, e.g. the sodium salt, of a compound of Formula VI is suitably employed. The reaction is preferably effected with stirring over an extended period, e.g. of from 1 to 24 hours. The resulting compound of Formula IVa may be isolated by conventional techniques, e.g. by shaking out the reaction mixture several times between water and a water-immiscible organic solvent, e.g. ethyl acetate or a chlorinated hydrocarbon such as methylene chloride, separating and combining the organic phases, extracting with an aqueous acid, e.g. 1 N tartaric acid or 1 N hydrochloric acid, liberating the basic compounds from the acid aqueous phase by addition of a weak base, e.g. an alkali metal carbonate or bicarbonate, and taking up in a water-immiscible organic solvent, e.g. ethyl acetate.

Process (c) may be effected in manner analogous to process (f) described above.

The compounds of Formula V employed as starting materials in process (c) may be produced by debenzylating a compound of Formula IX

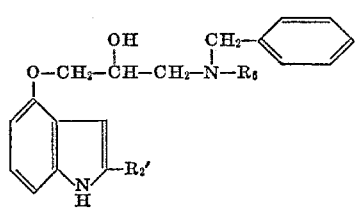   IX in which $R_2'$ has the above significance, and $R_6$ signifies a hydrogen atom or benzyl radical, and reacting the resulting compound of Formula X

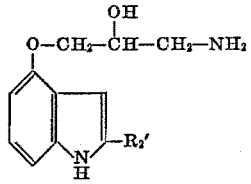   X in which $R_2'$ has the above significance, with a compound of Formula XI

   XI in which $R_3$ and $R_4$ have the above significance, or with a reactive derivative thereof.

The debenzylation may be effected in manner analogous to process (b) described above.

The reaction of a compound of Formula X with a compound of Formula XI is suitably effected in an organic solvent which is inert under the reaction conditions, e.g. a lower alkanol or an aromatic hydrocarbon such as benzene. Suitable reactive derivatives of Formula XI include ketals.

When the reaction is complete any excess ketone and solvent present may be distilled off and the resulting compound of Formula V may be employed in process (c) without further purification.

The compounds of Formula VI may be produced by (α) Debenzylating a compound of Formula XIa

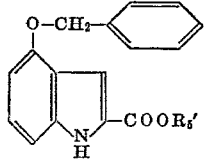   XIa in which $R_5'$ has the above significance, to produce a compound of Formula VIa

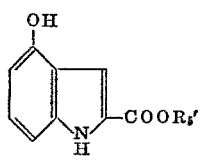   VIa in which $R_5'$ has the above significance, or (β) Reducing a compound of Formula XI

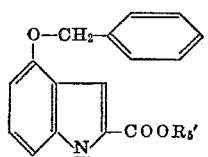   XI in which $R_5'$ has the above significance, and debenzylating the resulting 4-benzyloxy-2-hydroxy-methyl indole, to produce 4-hydroxy-2-hydroxy-methyl indole.

Process (α) and the debenzylation stage of process (β) may be effected in manner analogous to process (b) described above.

The reduction stage of process (β) may be effected in manner analogous to process (e) described above.

The compounds of Formula XIa are new and also form part of the present invention. They may be prepared by (g) Reacting 2-benzyloxy-6-nitrotoluene with a compound of Formula XII

   XII in which $R_5'$ has the above significance, in the presence of an alkaline condensation catalyst, and reductively cyclizing the resulting reaction product, or (h) Esterifying 4-benzyloxy-indole-2-carboxylic acid or 4-benzyloxy-indole-2-carbonyl chloride.

The condensation catalyst for use in process (g) may, for example, be an alkali metal alcoholate, such as potassium tert-butylate, or an alkali metal amide or hydride. The reductive cyclization may for example be effected with sodium dithionite in a weakly alkaline medium, or by the addition of a solution of the condensation product in glacial acetic acid to a boiling suspension of iron powder in a lower alkanol such as ethanol.

Process (h) may for example be effected reacting 4-benzyloxy-indole-2-carboxylic acid or -2-carbonyl chloride with a lower alkanol in the presence of a catalytic amount of sulphuric acid. The methyl ester may also be produced by reaction of 4-benzyloxy-indole-2-carboxylic acid with diazomethane in an organic solvent which is inert under the reaction conditions, e.g. acetone, or a lower alkanol such as methanol, or a mixture of methanol/acetone.

The compounds of Formula VIII, in which W signifies the group

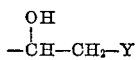

may be produced by reacting an amine of Formula VII with an epihalohydrin preferably at a temperature of about 20° to 120° C., e.g. for about 1 to 24 hours. This reaction is preferably effected in an organic solvent which is inert under the reaction conditions, e.g. an aromatic hydrocarbon such as benzene or toluene. The addition of an acid-binding agent, e.g. a tertiary organic base such as pyridine or triethyl amine, or an inorganic base, e.g. an alkali metal carbonate such as potassium carbonate, may be advantageous but is not essential. Working up may for example be effected by evaporating the solvent and distilling the reaction product obtained as residue in a high vacuum.

The compounds of Formula VIII, in which W signifies the group

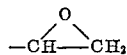

may be produced in manner known per se from compounds of Formula VIII, in which W signifies the group

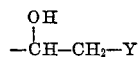

e.g. by treatment with an alkali.

The compounds of Formula IX may be produced by (γ) Reacting a compound of Formula II stated above with an amine of Formula XIII

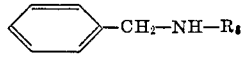    XIII in which $R_6$ has the above significance, or (δ) Reacting a compound of Formula XIV

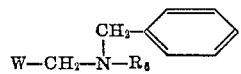    XIV in which W and $R_6$ have the above significance, in an alkaline medium, with a compound of Formula VI stated above.

Process (γ) may be effected in manner analogous to process (a) described above.

Process (δ) may be effected in manner analogous to process (ii) described above.

The compounds of Formula XIV may be produced in manner analogous to that described for the production of compounds of Formula VIII.

4-benzyloxy-indole-2-carboxylic acid is known.

Insofar as the production of the starting materials is not described, these are known or may be produced in manner known per se or in manner analogous to known processes or to the processes described herein.

The expression "in manner known per se" as used herein means methods in actual use or described in the literature on the subject.

In the compounds of Formula I, $R_1$ preferably signifies a $C_{1-5}$ alkyl radical, e.g. a methyl, ethyl or preferably an isopropyl, sec-butyl, tert-butyl, tert-pentyl or 3-pentyl radical, a $C_{3-4}$ cycloalkyl radical, a 3-phenylpropyl radical, or a 1-adamantyl radical.

In the following non-limitative examples all temperatures are indicated in degrees centigrade and are uncorrected.

EXAMPLE 1

4-(2-hydroxy-3-isopropylamino-propoxy)indole-2-carboxylic acid ethyl ester

A solution of 20 g. of sodium hydroxide in 500 cc. of water is added to a solution of 106 g. of 4-hydroxy-indole-2-carboxylic acid ethyl ester in 200 cc. of dioxane, and 120 g. of epichlorhydrine are added at room temperature and the mixture is stirred at 80° for three hours. After cooling extraction is effected with a mixture of 2 liters of chloroform and 400 cc. of dioxane, the organic phase is washed with a saturated common salt solution, is dried over sodium sulphate and evaporated to dryness. The dry residue is dissolved in 200 cc. of dioxane, 190 cc. of isopropylamine are added, the mixture is kept at a temperature of 65–70° for 1 hour and is again evaporated to dryness. The basic portion of the dry residue is separated in the usual manner and recrystallized from isopropanol; M.P. 149–151°.

The 4-hydroxy-indole-2-carboxylic acid ethyl ester, used as starting material, may, for example, be produced as follows:

A mixture of 0.14 kg. of potassium tert-butylate, 1.2 kg. of oxalic acid diethyl ester and 243 g. of 2-benzyloxy-6-nitro-toluene is heated to 60° for 2 hours, the butanol and ethanol are distilled off in a vacuum, the residue is shaken out between dilute acetic acid and toluene, the toluene solution is made neutral with a mixture of 110 cc. of a 20% sodium carbonate solution and 550 cc. of a saturated common salt solution, and the washed toluene solution is evaporated to dryness. A solution of the dry residue in glacial acetic acid is slowly added dropwise to a boiling suspension of 900 g. of iron powder in ethanol and the mixture is maintained under reflux for 1 hour. The cooled solution is made alkaline by the careful addition of a soda solution and is sucked off over Hyflo after the addition of Standard Super Oil. Washing is effected with water, the filter residue is stirred with chloroform at room temperature, is again sucked off over Hyflo and washed with chloroform. The chloroform solution is washed with water and subsequently concentrated by evaporation. The 4-benzyloxy-indole-2-carboxylic acid ethyl ester, obtained as residue, is recrystallized from trichloro ethylene; M.P. 168–170°. The product obtained above yields 4-hydroxy-indole-2-carboxylic acid ethyl ester (M.P. 159–160° from water) by catalytic debenzylation with palladium/hydrogen.

EXAMPLE 2

4-(2-hydroxy-3-isopropylamino-propoxy)indole-2-carboxylic acid methyl ester 9.5 g. of 4-hydroxy-indole-2-carboxylic acid methyl ester, 46 g. of epichlorhydrine and 2 drops of piperidine are heated to the boil for 4 hours. The excess epichlorhydrine is distilled off under reduced pressure and the residue is taken up in 15.65 g. of N-benzylisopropyl amine and 50 cc. of dioxane and is heated to the boil for 2½ hours. The solution is evaporated to dryness, the residue is triturated several times with petroleum ether (for the removal of the excess N-benzyl-isopropyl amine), and 4-[3 - (N - benzyl-isopropylamino)-2-hydroxy-propoxy]indole-2-carboxylic acid methyl ester, having a M.P. of 115–117°, is subsequently crystallized from ethanol/ethyl acetate.

16.8 g. of the above benzyl compound are dissolved in 200 cc. of methanol, and the solution is shaken in the presence of 5 g. of a palladium catalyst (5% of palladium on aluminium oxide with hydrogen until the taking up of hydrogen is completed. The catalyst is filtered off, the solution is evaporated to dryness under reduced pressure and the residue is subsequently shaken out between ethyl acetate and a 1 N tartaric acid solution.

The combined tartaric acid extracts are made alkaline by the careful addition of a 10% soda solution while cooling with ice and are subsequently extracted with methylene chloride. The evaporation residue of the methylene chloride phases which have been dried over magnesium sulphate, is crystallized from ethyl acetate. The title compound crystallizes in needles having a M.P. of 143–145° (N-cyclohexyl sulphamate, needles from ethanol/ether, M.P. 110–113°).

4-hydroxyq-indol-2-carboxylic acid methyl ester (M.P. 202–203°, needles from methanol) is obtained by debenzylation of 4 - benzyloxy - indole - 2-carboxylic acid methyl ester (M.P. 193–195° from ether), and the latter compound is obtained from 4-benzyloxy-indole-2-carboxylic acid by esterification with diazomethane in a solution of methanol/acetone.

EXAMPLE 3

4-(3-tert-butylamino-2-hydroxy-propoxy)indole-2-carboxylic acid ethyl ester

This compound is obtained in a manner analogous to that described in Example 2, except that (1) 4-hydroxy-indole-2-carboxylic acid ethyl ester is used in place of 4-hydroxy-indole-2-carboxylic acid methyl ester, and (2) N-benzyl-tert-butyl amine is used in place of N-benzylisopropyl amine.

4 - [3 - (N- benzyl-tert-butylamino)-2-hydroxy-propoxy]indole-2-carboxylic acid ethyl ester crystallizes as hydrochloride from ethanol; M.P. 227° (decomp.). Debenzylation in a manner analogus to that described in Example 2 yields the title compound, its N-cyclohexyl sulphamate crystallizing from ethanol/ether in needles having a M.P. of 169–171°.

EXAMPLE 4

4-(2-hydroxy-3-tert-pentylamino-propoxy)indole-2-carboxylic acid ethyl ester 30.5 g. of 4-hydroxy-indole-2-carboxylic acid ethyl ester, 165 g. of epichlorhydrine and 2 drops of piperidine are heated to the boil for 4½ hours. The excess epichlorhydrine is distilled off at reduced pressure and 14 g. of the remaining residue are taken up in 5.3 g. of tert-pentyl amine and 50 cc. of dioxane, and the reaction mixture is heated to the boil for 1½ hours. The solution is evaporated to dryness at reduced pressure and the residue is subsequently shaken out between ethyl acetate and a 1 N tartaric acid solution. The combined tartaric acid extracts are made alkaline by the careful addition of a 10% soda solution while cooling with ice and are subsequently extracted with methylene chloride. The methylene chloride phases are dried over magnesium sulphate and concentrated by evaporation. Crystallization of the evaporation residue from ethyl acetate yields the title compound as boat-like crystals having a M.P. of 135–137°.

Keller's colour reaction (0.2 mg.): strong blue
Van Urk's colour reaction (1 mg.): negative

EXAMPLE 5

4-(3-cyclopropyylamino-2-hydroxy-propoxy)indole-2-carboxylic acid ethyl ester

This compound is obtained in a manner analogous to that described in Example 4, except that cyclopropyl amine is used in place of tert-pentyl amine. The title compound crystallizes from ethyl acetate with a M.P. of 145–147°.

Keller's colour reaction (0.2 mg.): blue green
Van Urk's colour reaction (1 mg.): negative

EXAMPLE 6

4-(2-hydroxy-3-isopropylamino-propoxy)indole-2-carboxylic acid methyl ester 4.8 g. of 1 - (N-benzyl-isopropylamino)-3-chloro-2propanol are added to a solution of 1.91 g. of 4-hydroxyindole-2-carboxylic acid methyl ester and 0.4 g. of sodium hydroxide in 150 cc. of methanol, and the reaction mixture is heated to the boil for 20 hours. The solvent is evaporated at reduced pressure and the residue is triturated several times with petroleum ether. 4-[3-(N-benzyl-isopropylamino)-2-hydroxy-propoxy]indole-2-carboxylic acid methyl ester is obtained, this compound being identical with the intermediate produced in accordance with Example 2; M.P. 115–117° after crystallization from ethanol/ethyl acetate.

Debenzylation in a manner analogous to that described in Example 2 yields the titled compound, the N-cyclohexyl sulphamate of which crystallizes from ethanol/ether in needles having a M.P. of 110–113°.

The starting material may, for example, be produced as follows:

A mixture of 18.4 g. of epichlorhydrine and 29.8 g. of N-benzyl-isopropyl amine in 100 cc. of benzene is heated to the boil under reflux for 24 hours, the solvent is subsequently evaporated and the residue is distilled in a high vacuum; 1 - (N-benzyl-isopropylamino) - 3-chloro-2-propanol, having a B.P. of 110–115°/0.2 mm. of Hg is obtained.

EXAMPLE 7

4-(2-hydroxy-3-isopropylamino-propoxy)indole-2-carboxylic acid ethyl ester

This compound is obtained in a manner analogous to that described in Example 1, except that epiiodhydrine is used in place of epichlorhydrine. The title compound which is obtained is identical with the product produced in accordance with Example 1. M.P. 149–151° after crystallization from isopropanol.

EXAMPLE 8

4-(2-hydroxy-3-isopropylamino-propoxy)indole-2-carboxylic acid methyl ester

This compound is obtained in a manner analogous to that described in Example 2, except that epifluorhydrine is used in place of epichlorhydrine. The title compound which is obtained is identical with the product produced in accordance with Example 2. M.P. 143–145° after crystallization from ethyl acetate.

EXAMPLE 9

4-(3-tert-butylamino-2-hydroxy-propoxy)indole-2-carboxylic acid ethyl ester

This compound is obtained in a manner analogous to that described in Example 3, except that epibromhydrine is used in place of epichlorhydrine. The title compound which is obtained is identical with the product produced in accordance with Example 3. The N-cyclohexyl sulphamate of this compound crystallizes from ethanol/ether; M.P. 169–171°.

EXAMPLE 10

4-(2-hydroxy-3-tert-pentylamino-propyl)indole-2-carboxylic acid ethyl ester

This compound is obtained in a manner analogous to that described in Example 4, except that epibromhydrine is used in place of epichlorhydrine. The title compound which is obtained is identical with the product produced

EXAMPLE 11

4-(3-cyclopropylamino-2-hydroxy-propoxy)indole-2-carboxylic acid ethyl ester

This compound is obtained in a manner analogous to that described in Example 5, except that epiiodhydrine is used in place of epichlorhydrine. The title compound which is obtained is identical with the product produced in accordance with Example 5. M.P. 145–147° after crystallization from ethyl acetate.

EXAMPLE 12

4-(2-hydroxy-3-isopropylamino-propoxy)indole-2-carboxylic acid methyl ester

This compound is obtained in a manner analogous to that described in Example 6, except that epifluorhydrine is used in place of epichlorhydrine. The N-cyclohexyl sulphamate of the title compound is obtained after crystallization from ethanol/ether; M.P. 110–113°.

EXAMPLE 13

4-(2-hydroxy-3-isopropylamino-propoxy)indole-2-carboxylic acid methyl ester

This compound is obtained in a manner analogous to that described in Example 6, except that epiiodhydrine is used in place of epichlorhydrine. The N-cyclohexyl sulphamate of the title compound is obtained after crystallization from ethanol/ether; M.P. 110–113°.

EXAMPLE 14

4-(2-hydroxy-3-isopropylamino-propoxy)indole-2-carboxylic acid methyl ester

This compound is obtained in a manner analogous to that described in Example 6, except that epibromhydrine is used in place of epichlorhydrine. The N-cyclohexyl sulphamate of the title compound is obtained after crystallization from ethanol/ether, M.P. 110–113°.

EXAMPLE 15

4-(2-hydroxy-3-isopropylamino-propoxy)indole-2-carboxylic acid ethyl ester

4 - (3 - dibenzylamino-2-hydroxy-propoxy)indole-2-carboxylic acid ethyl ester is obtained as a viscous resin following the process described in Example 1, but using dibenzyl amine in place of isopropyl amine. 25 g. of this product are shaken with hydrogen without further purification and after the addition of 5 g. of a palladium catalyst (5% of palladium on charcoal) in 250 cc. of methanol until the taking up of hydrogen is completed. The catalyst is filtered off and the solvent is evaporated in a vacuum at room temperature. The resulting amorphous 4-(3 - amino-2-hydroxy-propoxy)-indole-2-carboxylic acid ethyl ester is immediately taken up in 300 cc. of acetone and is allowed to stand at room temperature for 24 hours. The acetone is subsequently evaporated at room temperature under reduced pressure. The amorphous imine is dissolved in 250 cc. of methanol 5 g. of a palladium catalyst (5% of palladium on aluminium oxide) are added and the mixture is shaken with hydrogen until the taking up of hydrogen is completed. The catalyst is filtered off and the solvent is evaporated at reduced pressure. The basic components are isolated from the dry residue in the usual manner by shaking out with a 1 N aqueous tartaric acid solution, and the title compound is subsequently crystallized from isopropanol; M.P. 149–151°.

EXAMPLE 16

4-(2-hydroxy-3-isopropylamino-propoxy)indole-2-carboxylic acid 19.6 g. of 4-(2-hydroxy-3-isopropylamino-propoxy)indole-2-carboxylic acid ethyl ester are heated to the boil while stirring for 15 hours with 12.3 g. of crystalline barium hydroxide in 600 cc. of water and 200 cc. of methanol, 39 cc. of 2 N sulphuric acid are subsequently added, the mixture is filtered through talc until clear and is subsequently concentrated under reduced pressure until crystallization commences. The title compound has a M.P. of 279–281° (decomp.) after crystallization from water. Its hydrochloride has a M.P. of 239–242° (decomp.).

Keller's colour reaction (0.2 mg.): blue
Van Urk's colour reaction (1 mg.): light pink The 4 - (2-hydroxy-3-isopropylamino-propoxy)indole-2-carboxylic acid ethyl ester, used as starting material, is produced in a manner analogous to that described in Example 1.

EXAMPLE 17

4-(2-hydroxy-3-isopropylamino-propoxy)indole-2-carboxylic acid 11.6 g. of 4 - (2 - hydroxy - 3 - isopropylamino - propoxy)indole-2-carboxylic acid ethyl ester are shaken with 120 g. of Amberlite IRA–400, 100 cc. of water and 300 cc. of methanol at 60° for 5 hours. The ion exchange resin is filtered off and the resulting aminoacid is subsequently separated from the exchange resin with 1 N hydrogen chloride. The acid solution is concentrated by evaporation and the residue crystallized from water. The hydrochloride of the title compound, having a M.P. of 239–242° (decomp.), is obtained.

EXAMPLE 18

2-hydroxy-methyl-4-(2-hydroxy-3-isopropylamino-propoxy)-indole

A solution of 14.7 g. of sodium hydroxide in 300 cc. of water is added to a solution of 37.3 g. of 4-hydroxy-2-hydroxy-methyl indole in 100 cc. of dioxane in an atmosphere of nitrogen and while stirring, and 57.5 cc. of epichlorhydrine are subsequently added. The mixture is stirred at room temperature for a further 5 hours, is subsequently extracted 4 times with 200 cc. portions of methylene chloride and the combined organic layers which have been dried over magnesium sulphate are concentrated by evaporation at reduced pressure.

15 g. of the residue are taken up in 100 cc. of dioxane and 30 cc. of isopropyl amine, and the mixture is heated to the boil for 15 hours. The solution is evaporated to dryness at reduced pressure, the residue is shaken thrice between ethyl acetate and a 1 N aqueous tartaric acid solution, and a 2 N caustic soda solution is subsequently added to the combined tartaric acid phases until an alkaline reaction is obtained. The alkaline solution is shaken out 4 times with 200 cc. portions of methylene chloride, the extracts are dried over magnesium sulphate and the solvent is evaporated at reduced pressure. The oily viscous crude product is first crystallized from ethyl acetate and subsequently from ethanol; the title compound has a M.P. of 145–148°.

Keller's colour reaction (0.2 mg.): violet
Van Urk's colour reaction (1 mg.): blue violet 4-hydroxy-2-hydroxy-methyl indole (M.P. 112–114° from benzene/ethyl acetate) is obtained by debenzylation of 4 - benzyloxy - 2 - hydroxy - methyl indole with hydrogen in the presence of a 5% palladium catalyst on aluminium oxide. 4 - benzyloxy - 2 - hydroxy - methyl indole (M.P. 109–111° from benzene) is produced by reduction of 4-benzyloxy-indole-2-carboxylic acid with lithium aluminium hydride in boiling dioxane.

This reduction may also be effected as follows: 1200 g. of a 70% solution of sodium dihydro-bis(2-methoxyethoxy) aluminate in benzene are added dropwise while stirring and in an atmosphere of nitrogen to a boiling suspension of 534 g. of 4-benzyloxy-indole-2-carboxylic acid and 4 liters of absolute benzene, and the mixture is kept at the boil for a further hour.

The reaction mixture is subsequently decomposed at 15–25° by the dropwise addition of 3 liters of 2 N hydrochloric acid. The mixture is filtered until clear and the organic phase is separated. The organic phase is washed twice with 800 cc. amounts of a 2 N caustic soda solution, is then dried over magnesium sulphate and concentrated by evaporation at reduced pressure.

EXAMPLE 19

2-hydroxy-methyl-4-(2-hydroxy-3-isopropylamino-propoxy)-indole

This compound is obtained in a manner analogous to that described in Example 18, except that epibromhydrine is used in place of epichlorhydrine.

The product is identical with the compound obtained in accordance with Example 18.

EXAMPLE 20

4-(2-hydroxy-3-isopropylamino-propoxy)-2-hydroxy-methyl indole 16.3 g. of 4-hydroxy-2-hydroxy-methyl indole and 110 g. of epichlorhydrine are heated to the boil for 3 hours after the addition of 2 drops of piperidine. The excess epichlorhydrine is distilled off.

15 g. of the residue are taken up in 100 cc. of dioxane and 30 cc. of isopropyl amine and the mixture is heated to the boil for 15 hours. The solution is evaporated to dryness at reduced pressure, the residue is shaken thrice between ethyl acetate and a 1 N aqueous tartaric acid solution, and a 2 N caustic soda solution is subsequently added to the combined tartaric acid phases until an alkaline reaction is obtained. The alkaline solution is then shaken out 4 times with 200 cc. amounts of methylene chloride, the extracts are dried over magnesium sulphate and the solvent is evaporated at reduced pressure. The oily viscous crude product is first crystallized from ethyl acetate and subsequently from ethanol; the title compound has a M.P. of 145–148°.

Keller's colour reaction (0.2 mg.): violet
Van Urk's colour reaction (1 mg.): blue violet

EXAMPLE 21

4-(3-tert-butylamino-2-hydroxy-propoxy)-2-hydroxy-methyl indole

A solution of 14.7 g. of sodium hydroxide in 300 cc. of water is added while stirring and in an atmosphere of nitrogen to a solution of 37.3 g. of 4-hydroxy-2-hydroxy-methyl indole in 100 cc. of dioxane, and 57.5 cc. of epichlorhydrine are subsequently added. The reaction mixture is stirred at room temperature for a further 5 hours, is extracted 4 times with methylene chloride, and the combined organic layers which have been dried over magnesium sulphate are concentrated by evaporation at reduced pressure.

22.5 g. of the residue are taken up in 100 cc. of dioxane and 35 cc. of tert-butyl amine, and the mixture is heated to the boil for 18 hours. The solution is evaporated to dryness at reduced pressure, the residue is shaken thrice between ethyl acetate and a 1 N tartaric acid solution, and a 2 N caustic soda solution is subsequently added to the combined tartaric acid phases until an alkaline reaction is obtained. The alkaline solution is then shaken out 4 times with 200 cc. amounts of methylene chloride, the extracts are dried over magnesium sulphate and the solvent is evaporated at reduced pressure. The oily viscous crude product is crystallized from ethyl acetate and subsequently recrystallized from the same solvent. The title compound is obtained as gravelly crystalline product having a M.P. of 124–126°.

Keller's colour reaction (0.2 mg.): blue violet
Van Urk's colour reaction (1 mg.): violet

EXAMPLE 22

4-(3-tert-butylamino-2-hydroxy-propoxy)-2-hydroxy-methyl indole

A solution of 14.7 g. of sodium hydroxide in 300 cc. of water is added while stirring and in an atmosphere of nitrogen to a solution of 37.3 g. of 4-hydroxy-2-hydroxy-methyl indole in 100 cc. of dioxane, and 55.8 g. of epifluorhydrine are subsequently added. The reaction mixture is stirred at room temperature for a further 5 hours, is extracted 4 times with methylene chloride, and the combined organic layers which have been dried over magnesium sulphate are concentrated by evaporation at reduced pressure.

22.5 g. of the residue are taken up in 100 cc. of dioxane and 35 cc. of tert-butyl amine, and the mixture is heated to the boil for 18 hours. The solution is evaporated to dryness at reduced pressure, the residue is shaken thrice between ethyl acetate and a 1 N tartaric acid solution, and a 2 N sodium hydroxide solution is subsequently added to the combined tartaric acid phases until an alkaline reaction is obtained. The alkaline solution is then shaken out 4 times with 200 cc. amounts of methylene chloride, the extracts are dried over magnesium sulphate and the solvent is evaporated at reduced pressure. The oily viscous crude product is crystallized with ethyl acetate and is subsequently recrystallized from the same solvent. The title compound is obtained as gravelly crystalline product having a M.P. of 124–126°

EXAMPLE 23

4-(3-sec-butylamino-2-hydroxy-propoxy)-2-hydroxy-methyl indole

A solution of 14.7 g. of sodium hydroxide in 300 cc. of water is added while stirring and in an atmosphere of nitrogen to a solution of 37.3 g. of 4-hydroxy-2-hydroxy-methyl indole in 100 cc. of dioxane, and 57.5 cc. of epichlorhydrine are subsequently added. The reaction mixture is stirred at room temperature for a further 5 hours, is extracted 4 times with methylene chloride, and the combined organic layers which have been dried over magnesium sulphate are concentrated by evaporation at reduced pressure.

12.9 g. of the residue are taken up in 45 cc. of dioxane and 20 cc. of sec-butyl amine, and the mixture is heated to the boil for 20 hours. The solution is evaporated to dryness at reduced pressure, the residue is shaken out thrice between ethyl acetate and a 1 N tartaric acid solution, and the combined tartaric acid phases are made alkaline with 5 N sodium hydroxide. The reaction mixture is extracted with methylene chloride, the extracts are dried over magnesium sulphate and the solvent is evaporated at reduced pressure. After recrystallization of the evaporation residue from ethyl acetate/ether the title compound, having a M.P. of 110–111°, is obtained Keller's colour reaction (0.2 mg.): blue violet
Van Urk's colour reaction (1 mg.): violet

EXAMPLE 24

4-(3-sec-butylamino-2-hydroxy-propoxy)-2-hydroxy-methyl indole

This compound is obtained in a manner analogous to that described in Example 23, except that epibromhydrine is used in place of epichlorhydrine. The title compound which is obtained is identical with the product produced in accordance with Example 23. M.P. 110–111° after crystallization from ethyl acetate/ether.

EXAMPLE 25

4-(3-sec-butylamino-2-hydroxy-propoxy)-2-hydroxy-methyl indole

This compound is obtained in a manner analogous to that described in Example 23, except that epiiodhydrine is used in place of epichlorhydrine. The title compound which is obtained is identical with the product produced in accordance with Example 23. M.P. 110–111° after crystallization from ethyl acetate/ether.

EXAMPLE 26

4-(3-sec-butylamino-2-hydroxy-propoxy)-2-hydroxy-methyl indole

This compound is obtained in a manner analogous to that described in Example 23, except that epifluorhydrine is used in place of epichlorhydrine. The title compound which is obtained is identical with the product produced in accordance with Example 23. M.P. 110–111° after crystallization from ethyl acetate/ether.

EXAMPLE 27

4-(3-cyclopropylamine-2-hydroxy-propoxy)-2-hydroxy-methyl indole

A solution of 14.7 g. of sodium hydroxide in 300 cc. of water is added while stirring and in an atmosphere of nitrogen to a solution of 37.3 g. of 4-hydroxy-2-hydroxy-methyl indole in 100 cc. of dioxane, and 57.5 cc. of epichlorhydrine are subsequently added. The reaction mixture is stirred at room temperature for a further five hours, is extracted 4 times with methylene chloride, and the combined organic layers which have been dried over magnesium sulphate are concentrated by evaporation at reduced pressure.

12.9 g. of the residue are taken up in 45 cc. of dioxane and 20 cc. of cyclopropyl amine, and the mixture is heated to the boil for 20 hours. The solution is evaporated to dryness at reduced pressure, the residue is shaken out thrice between ethyl acetate and a 1 N tartaric acid solution, and the combined tartaric acid phases are made alkaline with 5 N sodium hydroxide. The reaction mixture is then extracted with methylene chloride, the extracts are dried over magnesium sulphate and the solvent is evaporated at reduced pressure. The title compound, having a M.P. of 137–140°, is obtained by recrystallization of the evaporation residue from ethyl acetate.

Keller's colour reaction (0.2 mg.): dark blue-violet
Van Urk's colour reaction (1 mg.): dull violet

EXAMPLE 28

4-(2-hydroxy-3-tert-pentylamino-propoxy)-2-hydroxy-methyl indole

This compound is obtained in a manner analogous to that described in Example 27, except that tert-pentyl amine is used in place of cyclopropyl amine. The hydrogen maleate of the title compound crystallizes from ethanol/acetone/ethyl acetate in crystals having a M.P. of 123–129°.

Keler's colour reaction (0.2 mg.): brown violet
Van Urk's colour reaction (1 mg.): violet

EXAMPLE 29

4-[2-hydroxy-3-(3-pentylamino)propoxy]-2-hydroxy-methyl indole

This compound is obtained in a manner analogous to that described in Example 27, except that 3-pentyl amine is used in place of cyclopropyl amine. The title compound crystallizes from ethyl acetate; M.P. 126–127°.

Keller's colour reaction (0.2 mg.): brown
Van Urk's colour reaction (1 mg.): light violet

EXAMPLE 30

4-[3-(1-adamantylamino)-2-hydroxy-propoxy]-2-hydroxy-methyl indole

This compound is obtained in a manner analogous to that described in Example 27, except that 1-adamantyl amine is used in place of cyclopropyl amine. The title compound crystallizes from ethanol; M.P. 199–201°.

Keller's colour reaction (0.2 mg.): violet
Van Urk's colour reaction (1 mg.): violet-dark blue

EXAMPLE 31

4-(3-cyclopropylamino-2-hydroxy-propoxy)-2-hydroxy-methyl indole

This compound is obtained in a manner analogous to that described in Example 27, except that epiiodhydrine is used in place of epichlorhydrine. The title compound which is obtained is identical with the product produced in accordance with Example 27. M.P. 137–140° after crystallization from ethyl acetate.

EXAMPLE 32

4-(2-hydroxy-3-tert-pentylamino-propoxy)-2-hydroxy-methyl indole

This compound is obtained in a manner analogous to that described in Example 28, except that epibromhydrine is used in place of epichlorhydrine. The title compound which is obtained is identical with the product produced in accordance with Example 28. M.P. 123–129° after crystallization from ethanol/acetone/ethyl acetate.

EXAMPLE 33

4-[2-hydroxy-3-(3-pentylamino)propoxy]-2-hydroxy-methyl indole

This compound is obtained in a manner analogous to that described in Example 29, except that epifluorohydrine is used in place of epichlorhydrine. The title compound which is obtained is identical with the product produced in accordance with Example 29. M.P. 126–127° after crystallization from ethyl acetate.

EXAMPLE 34

4-(2-hydroxy-3-isopropylamino-propoxy)-2-hydroxy-methyl indole 4.8 g. of 1-(N-benzyl-isopropylamino)-3-chloro-2-propanol are added to a solution of 1.61 g. of 4-hydroxy-2-hydroxy-methyl indole and 0.4 g. of sodium hydroxide in 150 cc. of methanol, and the mixture is heated to the boil for 20 hours. The solvent is evaporated at reduced pressure, the residue is triturated several times with petroleum ether and is subsequently shaken out between water and ethyl acetate. The combined ethyl acetate phases which have been dried over magnesium sulphate are concentrated by evaporation at reduced pressure. The resulting amorphous 4-[3-(N-benzyl-isopropylamino)-2-hydroxy-propoxy]-2-hydroxy-methyl indole is taken up in 100 cc. of methanol and is shaken with hydrogen after the addition of 1 g. of a palladium catalyst (5% of palladium on aluminium oxide) until the taking up of hydrogen is completed. The catalyst is filtered off, the solution is evaporated to dryness at reduced pressure and the residue is subsequently shaken out between ethyl acetate and a 1 N tartaric acid solution. The combined tartaric acid extracts are made alkaline with 5 N sodium hydroxide while cooling with ice and are subsequently extracted with methylene chloride. The evaporation residue of the methylene chloride phases which have been dried over magnesium sulphate is crystallized from ethyl acetate. The title compound crystallizes with a M.P. of 145–148°.

The production of 1-(N-benzyl-isopropylamino)-3-chloro-2-propanol, required as starting material, is effected in a manner analogous to that described in Example 6.

EXAMPLE 35

4-(2-hydroxy-3-isopropylamino-propoxy)-
2-hydroxy-methyl indole

This compound is obtained in a manner analogous to that described in Example 34, except that 1-(N-benzyl-isopropylamino)-3-bromo-2-propanol is used in place of 1-(N-benzyl-isopropylamino) - 3 - chloro-2-propanol. The title compound which is obtained is identical with the product produced in accordance with Example 34. M.P. 145–148° after crystallization from ethyl acetate.

EXAMPLE 36

4-(2-hydroxy-3-isopropylamino-propoxy)-
2-hydroxy-methyl indole

This compound is obtained in a manner analogous to that described in Example 34, except that 1-(N-benzyl-isopropylamino)-3-fluoro-2-propanol is used in place of 1-(N-benzyl-isopropylamino) - 3 - chloro-2-propanol. The title compound which is obtained is identical with the product produced in accordance with Example 34. M.P. 145–148° after crystallization from ethyl acetate.

EXAMPLE 37

4-(2-hydroxy-3-isopropylamino-propoxy)-
2-hydroxy-methyl indole

This compound is obtained in a manner analogous to that described in Example 34, except that 1-(N-benzyl-isopropylamino)-3-iodo-2-propanol is used in place of 1-(N-benzyl-isopropylamino) - 3 - chloro-2-propanol. The title compound which is obtained is identical with the product produced in accordance with Example 34. M.P. 145–148° after crystallization from ethyl acetate.

EXAMPLE 38

4-(2-hydroxy-3-isopropylamino-propoxy-
2-hydroxy-methyl indole

A solution of 32 g. of 4-(2-hydroxy-3-isopropylamino-propoxy)indole-2-carboxylic acid ethyl ester in 250 cc. of absolute tetrahydrofuran is added dropwise during the course of 15 minutes and in an atmosphere of nitrogen to a boiling suspension of 7.6 g. of lithium aluminium hydride in 200 cc. of absolute tetrahydrofuran, and the mixture is stirred for a further 2 hours. The reaction mixture is subsequently cooled to 40° and 20 cc. of water are added dropwise. The resulting precipitate is filtered off, is washed out well with tetrahydrofuran, and the organic solution is dried over sodium sulphate. The evaporation residue of the same is recrystallized from 480 cc. of acetonitrile and yields the title compound. M.P. 145–147°.

The 4-(2-hydroxy-3-isopropylamino-propoxy)indole-2-carboxylic acid ethyl ester, required as starting material, is produced in a manner analogous to that described in Example 1.

EXAMPLE 39

4-[2-hydroxy-3-(3-pentylamino)propoxy]-
2-hydroxy-methyl indole 4-(3-dibenzylamino - 2 - hydroxy-propoxy)-2-hydroxy-methyl indole is obtained as viscous oil in a manner analogous to that described in Example 18, but using dibenzyl amine in place of isopropyl amine.

9 g. of this crude product are shaken with hydrogen, without further purification and after the addition of 3 g. of a palladium catalyst (5% of palladium on charcoal) in 50 cc. of methanol, until the taking up of hydrogen is completed. The catalyst is filtered off and the solvent is evaporated at reduced pressure. The resulting amorphous 4-(3-amino-2-hydroxy-propoxy)-2-hydroxy-methyl indole is dissolved in 35 cc. of diethyl ketone and is allowed to stand at room temperature for 24 hours. The solution is subsequently evaporated to dryness at reduced pressure, the residue is dissolved in 150 cc. of ethanol, and 5 g. of sodium borohydride are added portionwise at 0° while stirring. The reaction mixture is subsequently stirred for a further 3 hours at room temperature, is evaporated to dryness at reduced pressure, and the basic components are subsequently isolated in a manner analogous to that described in Example 18. The title compound crystallizes from ethyl acetate; M.P. 126–127°.

EXAMPLE 40

4-(2-hydroxy-3-isopropylamino-propoxy)-
2-hydroxy-methyl indole 25 g. of 4-(3-dibenzylamino-2-hydroxy-propoxy)indole-2-carboxylic acid ethyl ester are shaken with hydrogen in 250 cc. of methanol and in the presence of 5 g. of a palladium catalyst (5% of palladium on charcoal) until the taking up of hydrogen is completed. The catalyst is filtered off and the solvent is evaporated in a vacuum at room temperature. The resulting amorphous 4-(3-amino-2-hydroxy-propoxy)indole-2-carboxylic acid ethyl ester is immediately taken up in 300 cc. of acetone and is allowed to stand at room temperature for 24 hours. The acetone is subsequently evaporated at room temperature and at reduced pressure.

3.1 g. of the resulting imine are taken up in 50 cc. of tetrahydrofuran and are added while stirring and in an atmosphere of nitrogen to a boiling suspension of 0.6 g. of lithium aluminium hydride in 150 cc. of absolute tetrahydrofuran.

The reaction mixture is stirred at the boil for a further hour, is subsequently cooled to 40°, 20 cc. of water are added dropwise and the organic phase is separated. The resulting precipitate is filtered off, is washed out well with tetrahydrofuran, and the combined organic phases are dried over sodium sulphate. The evaporation residue of the same is recrystallized from 480 cc. of acetonitrile and yields the title compound. M.P. 145–147°.

The 4 - (3-dibenzylamino-2-hydroxy-propoxy)indole-2-carboxylic acid ethyl ester, used as starting material, is produced in a manner analogous to that described in Example 15.

EXAMPLE 41

4-(2-hydroxy-3-isopropylamino-propoxy)-
2-hydroxy-methyl indole 3.18 g. of the imine produced in Example 40 are taken up in 50 cc. of tetrahydrofuran and are added dropwise while stirring and in an atmosphere of nitrogen to a boiling solution of 11.6 g. of a 70% benzene solution of sodium dihydro-bis(2-methoxy-ethoxy) aluminate in 100 cc. of absolute tetrahydrofuran.

The reaction mixture is stirred at the boil for a further hour and is then worked up in a manner analogous to that described in Example 40.

The title compound which is obtained is identical with the product produced in accordance with Example 40. M.P. 145–147° after crystallization from acetonitrile.

EXAMPLE 42

4-(3-methylamino-2-hydroxy-propoxy)-2-
hydroxy-methyl indole 4-(3-benzyl-methylamino-2-hydroxy-proxy)-2-hydroxy-methyl indole (M.P. 122–124° from ethyl acetate) is obtained in a manner analogous to that described in Example 18, but using N-benzylmethyl amine in place of isopropyl amine. In a manner analogous to that described in Example 34 this compound is taken up in methanol, and after the addition of a palladium catalyst (5% of palladium on aluminium oxide) it is shaken with hydrogen until the taking up of hydrogen is completed. The catalyst is filtered off, the solution is evaporated to dryness at reduced pressure, and the residue is subsequently shaken out between ethyl acetate and a 1 N tartaric acid solution. The combined tartaric acid extracts are made alkaline with a 5 N sodium hydroxide solution while cooling with ice and subsequently extracted with methylene chloride. The evaporation residue of the methylene chloride phases which have been dried over magnesium sulphate is crystallized from ethanol. The title compound crystallizes with a M.P. of 136–138°.

EXAMPLE 43

4-(3-tert-butylamino-2-hydroxy-propoxy) indole-2-carboxylic acid

This compound is obtained in a manner analogous to that described in Example 16, except that 4-(3-tert-butylamino - 2-hydroxypropoxy)indole-2-carboxylic acid ethyl ester is used in place of 4-(2-hydroxy-3-isopropylaminopropoxy)indole-2-carboxylic acid ethyl ester. The title compound crystallizes from water in needles having a M.P. of 294–300° (decomp.).

The 4-(3-tert-butylamino-2-hydroxy-propoxy)indole-2-carboxylic acid ethyl ester, used as starting material, may, for example, be produced in a manner analogous to that described in Example 3.

EXAMPLE 44

4-(2-hydroxy-3-isopropylamino-propoxy)indole-2-carboxylic acid isopropyl ester 50.6 g. of 4-hydroxy-indole-2-carboxylic acid isopropyl ester, 215 cc. of epichlorhydrin, and 5 drops of piperidine are refluxed to the boil for 8 hours. The excess epichlorhydrin is then evaporated at reduced pressure. 21 g. of the thus obtained crude epoxide are taken up with 13 g. of benzyl isopropylamine in 100 cc. of dioxane and heated to the boil under reflux for 8 hours. The solvent and the excess benzyl isopropylamine are evaporated in vacuo and the basic portion is isolated in the usual way from the residue by shaking out between ethyl acetate and 1 N tartaric acid solution. 22 g. of the obtained 4-(3-benzylisopropylamino - 2 - hydroxy-propoxy)indole-2-carboxylic acid isopropyl ester are shaken with 10 g. of a palladium catalyst (5% of palladium on carbon) in 400 cc. of isopropanol with hydrogen until the taking up of hydrogen is completed. The catalyst is filtered off, the solution is evaporated to dryness under reduced pressure and the title compound is crystallized from ethyl acetate/petroleum ether; M.P. 167–168° C., needles.

EXAMPLE 45

4-(3-tert-butylamino-2-hydroxy-propoxy)indole-2-carboxylic acid isopropyl ester

This compound is obtained in a manner analogous to that described in Example 44, except that benzyl-tert-butylamine is used in place of benzyl isopropylamine. The title compound crystallizes from ethyl aceate/ether in crystals of a M.P. 137–140° C.

EXAMPLE 46

Galenic preparation: tablets

|  | G. |
|---|---|
| 4-(2-hydroxy - 3 - isopropylamino-propoxy)indole-2-carboxylic acid ethyl ester | 0.0200 |
| Magnesium stearate | 0.0010 |
| Polyvinyl pyrrolidone | 0.0040 |
| Talc | 0.0080 |
| Maize starch | 0.0100 |
| Lactose | 0.1535 |
| Dimethyl silicone oil | 0.0005 |
| Polyethylene glycol 6000 | 0.0030 |
| For a tablet of | 0.2000 |

4-(2-hydroxy - 3 - isopropylamino-propoxy)-2-hydroxymethyl indole may, for example, also be used as active material in place of 4-(2-hydroxy-3-isopropylamino-propoxy)indole-2-carboxylic acid ethyl ester, whereby the same volume ratios may be used.

What is claimed is:

1. A compound of formula:

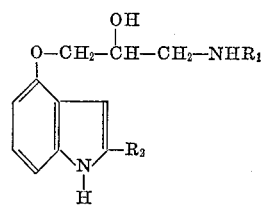

in which $R_1$ is lower alkyl, cycloalkyl having 3 to 4 carbon atoms, phenylalkyl of 8 to 10 carbon atoms or 1-adamantyl, and $R_2$ is hydroxymethyl or $COOR_5$ where $R_5$ is a hydrogen atom or lower alkyl radical, and pharmaceutically acceptable acid addition salts thereof.

2. The compound of claim 1, which is 4-(2-hydroxy-3-isopropylamino-propoxy)indole-2-carboxylic acid ethyl ester.

3. The compound of claim 1, which is 4-(2-hydroxy-3-isopropylamino-propoxy)indole-2-carboxylic acid methyl ester.

4. The compound of claim 1, which is 4-(2-hydroxy-3-tert-butylamino-propoxy)indole-2-carboxylic acid ethyl ester.

5. The compound of claim 1, which is 4-(2-hydroxy-3-tert-pentylamino-propoxy)indole-2-carboxylic acid ethyl ester.

6. The compound of claim 1, which is 4-(2-hydroxy-3-cyclopropylamino-propoxy)indole-2-carboxylic acid ethyl ester.

7. The compound of claim 1, which is 4-(2-hydroxy-3-isopropylamino-propoxy)indole-2-carboxylic acid.

8. The compound of claim 1, which is 4-(2-hydroxy-3-tert-butylamino-propoxy)indole-2-carboxylic acid.

9. The compound of claim 1, which is 4-(2-hydroxy-3-methylamino-propoxy)-2-hydroxy-methyl indole.

10. The compound of claim 1, which is 2-hydroxymethyl-4-(2-hydroxy-3-isopropylamino-propoxy) indole.

11. The compound of claim 1, which is 2-hydroxymethyl-4-(2-hydroxy-3-tert-butylamino-propoxy) indole.

12. The compound of claim 1, which is 2-hydroxymethyl-4-(2-hydroxy-3-sec-butylamino-propoxy) indole.

13. The compound of claim 1, which is 2-hydroxymethyl-4-(2 - hydroxy - 3 - cyclopropylamino-propoxy) indole.

14. The compound of claim 1, which is 2-hydroxymethyl-4-(2-hydroxy-3-tert-pentylamino-propoxy)indole.

15. The compound of claim 1, which is 2-hydroxymethyl-4-(2-hydroxy-3-adamantylamino-propoxy) indole.

16. The compound of claim 1, which is 2-hydroxymethyl-4-[2-hydroxy-3-(3-pentylamino)propoxy] indole.

17. The compound of claim 1, which is 4-(2-hydroxy-3-isopropylamino-propoxy)indole-2-carboxylic acid isopropyl ester.

18. The compound of claim 1, which is 4-(3-tert-butylamino-2-hydroxy-propoxy)indole - 2 - carboxylic acid isopropyl ester.

References Cited

UNITED STATES PATENTS 3,471,515  10/1969  Troxler et al. ____ 260—326.15

ALEX MAZEL, Primary Examiner

J. A. NARCAVAGE, Assistant Examiner

U.S. Cl. X.R.

260—326.13 R, 326.15; 424—274

Disclaimer 3,705,907.—*Franz Troxler*, Bottmingen, Switzerland. 4 - (2 - HYDROXY - 3-AMINOPROPOXY) - INDOLE DERIVATIVES. Patent dated Dec. 12, 1972. Disclaimer filed Oct. 16, 1972, by the assignee, *Sandoz Ltd.*

Hereby disclaims the portion of the term of the patent subsequent to Oct. 3, 1989.

[*Official Gazette October 16, 1973.*]